(12) United States Patent
Lee et al.

(10) Patent No.: US 11,978,222 B2
(45) Date of Patent: May 7, 2024

(54) THREE-DIMENSIONAL LIGHT FIELD TECHNOLOGY-BASED OPTICAL UNMANNED AERIAL VEHICLE MONITORING SYSTEM

(71) Applicant: SHENZHEN VISION POWER TECHNOLOGY CO., LTD., Guangdong (CN)

(72) Inventors: Ying Chiu Herbert Lee, Hong Kong (CN); Li-Hua Lilly Li, Hong Kong (CN)

(73) Assignee: SHENZHEN VISION POWER TECHNOLOGY CO., LTD., Shenzhen (CN)

( * ) Notice: Subject to any disclaimer, the term of this patent is extended or adjusted under 35 U.S.C. 154(b) by 408 days.

(21) Appl. No.: 17/601,819

(22) PCT Filed: Mar. 13, 2020

(86) PCT No.: PCT/CN2020/079089
§ 371 (c)(1),
(2) Date: Oct. 6, 2021

(87) PCT Pub. No.: WO2020/207185
PCT Pub. Date: Oct. 15, 2020

(65) Prior Publication Data
US 2022/0172380 A1    Jun. 2, 2022

(30) Foreign Application Priority Data
Apr. 8, 2019    (CN) .......................... 201910277372.1

(51) Int. Cl.
G06T 7/292    (2017.01)
G06T 7/557    (2017.01)
(Continued)

(52) U.S. Cl.
CPC .............. *G06T 7/292* (2017.01); *G06T 7/557* (2017.01); *G06T 7/70* (2017.01); *H04N 23/51* (2023.01);
(Continued)

(58) Field of Classification Search
CPC .............. G06T 2207/10028; G06T 7/50; G06T 2207/10032; G06T 7/70; G06T 2200/04;
(Continued)

(56) References Cited

U.S. PATENT DOCUMENTS

2017/0261613 A1*  9/2017  Van Voorst ........... G01S 7/4817
2018/0259342 A1   9/2018  Bitra et al.
(Continued)

FOREIGN PATENT DOCUMENTS

CN    101547344 A    9/2009
CN    102528821 A    7/2012
(Continued)

OTHER PUBLICATIONS

International Search Report issued in connection with the corresponding International Application No. PCT/CN2020/079089 dated Jun. 9, 2020.
(Continued)

Primary Examiner — Dung Hong
(74) Attorney, Agent, or Firm — The H.T. Than Law Group

(57) ABSTRACT

Disclosed is a light field technology-based unmanned aerial vehicle monitoring system. Said unmanned aerial vehicle monitoring system comprises: a first camera, configured to continuously obtain image information in a monitored area; a second camera, the second camera being a light field camera including a compound eye lens, and being configured to obtain, when it is determined that the obtained image information is of an unmanned aerial vehicle, light field
(Continued)

information of the unmanned aerial vehicle; a vertical rotating platform and a horizontal rotating platform arranged perpendicular to each other, wherein the first camera and the second camera can rotate synchronously under the control of the vertical rotating platform and the horizontal rotating platform; and a computer processor, configured to calculate depth information of the unmanned aerial vehicle by means of the obtained light field information so as to obtain the position of the unmanned aerial vehicle. The three-dimensional light field technology-based optical unmanned aerial vehicle monitoring system provided in the present invention can isolate vibration in a monitoring process, thereby improving the efficiency and accuracy during the monitoring or detection of an unmanned aerial vehicle.

10 Claims, 6 Drawing Sheets

(51) Int. Cl.
  *G06T 7/70* (2017.01)
  *H04N 23/51* (2023.01)
  *H04N 23/53* (2023.01)
  *H04N 23/695* (2023.01)
  *H04N 23/957* (2023.01)

(52) U.S. Cl.
  CPC ......... *H04N 23/531* (2023.01); *H04N 23/695* (2023.01); *H04N 23/957* (2023.01)

(58) Field of Classification Search
  CPC ..... G06T 2200/08; G06T 7/292; G06T 7/557; H04N 23/957; H04N 23/51; H04N 23/695; H04N 23/531
  See application file for complete search history.

(56) References Cited

U.S. PATENT DOCUMENTS

| | | | |
|---|---|---|---|
| 2018/0329020 A1* | 11/2018 | Hafizovic | ................. G01S 5/20 |
| 2019/0138029 A1* | 5/2019 | Ryll | ....................... B64D 47/08 |
| 2019/0141226 A1* | 5/2019 | Lee | .................... G02B 27/0075 |
| 2020/0068102 A1* | 2/2020 | Tilleman | ................. H04N 23/56 |

FOREIGN PATENT DOCUMENTS

| | | | | |
|---|---|---|---|---|
| CN | 105635530 A | | 6/2016 | |
| CN | 106707296 A | | 5/2017 | |
| CN | 107578437 A | | 1/2018 | |
| CN | 108447075 A | * | 8/2018 | ............. G06T 7/246 |
| CN | 106707296 B | * | 3/2019 | ............. G01S 17/89 |
| CN | 210327775 U | | 4/2020 | |

OTHER PUBLICATIONS

Machine translation of CN 210327775 to Shenzhen Visumotion Co., Ltd.
Machine translation of CN 106707296 to Ma et al.
Machine translation of CN 101547344 to Yang et al.
Machine translation of CN 107578437 to Gao et al.
Machine translation of CN 105635530 to Tan Zheng.
Machine translation of CN 102528821 to Ruan et al.
Xiaojie Xie et al. "A Target Depth Measurement Method Based on Light Field Imaging". 2016 9th International Symposium on Computational Intelligence and Design (ISCID), Jan. 26, 2017. ISSN: 2473-3547.

* cited by examiner

THREE-DIMENSIONAL LIGHT FIELD TECHNOLOGY-BASED OPTICAL UNMANNED AERIAL VEHICLE MONITORING SYSTEM

TECHNICAL FIELD

The present invention relates to the field of monitoring unmanned aerial vehicles, and particularly relates to a system for monitoring an unmanned aerial vehicle based on light field technology.

BACKGROUND

With a development of unmanned aerial vehicle technology, (in consideration of the definitions of unmanned aerial vehicle ("UAV") and drone, the unmanned aerial vehicle mentioned in full text of the present case could be replaced by drone) there exists an extensive demand for an improvement on a system of monitoring an unmanned aerial vehicle, and usually, a monitoring system in which a radar is combined with a camera is adopted in prior art. Radar monitoring technology is susceptible to deception by stealth technology, and has a poor low-altitude monitoring effect, and generally, the camera has a low resolution. Chinese Patent Application No. 201810128587.2 discloses a system of monitoring an unmanned aerial vehicle and a supervision method thereof. In the method, an image in an area is scanned using a software method, stereoscopic vision is formed by a first camera and a second camera to judge whether a suspicious target exists in the image, and the suspicious target is tracked and photographed by calculating an accurate position of the suspicious target. The technology mainly achieves an improvement on software. Chinese Patent Application No. 201810396720.2 discloses an unmanned aerial vehicle detection method and apparatus as well as an electronic device. Mainly from the perspective of software, a camera on a detection platform is controlled to rotate, during which a rotation instruction is sent to a motor of a rotating platform, such that the motor drives a plurality of cameras on the rotating platform to rotate by a preset angle; a stop instruction is sent to the motor, such that the motor controls the rotating platform to stop rotating after the rotating platform is rotated by the preset angle; when it is determined that the above-mentioned plurality of cameras have been stopped for a preset time, the above-mentioned plurality of cameras are controlled to perform one shoot to obtain a plurality of images; image recognition is performed on the plurality of images to determine whether an unmanned aerial vehicle exists in a monitored area; and if no unmanned aerial vehicle exists in the monitored area, the above steps are repeated.

There exists a need for a new high-resolution and stable monitoring system which obtains a clear stereo image so as to improve efficiency and accuracy in a process of monitoring or detecting the unmanned aerial vehicle.

SUMMARY

An object of the present invention is to provide a new high-resolution and stable monitoring system which obtains a clear stereo image so as to improve efficiency and accuracy in a process of monitoring or detecting an unmanned aerial vehicle.

The present invention discloses a system of monitoring an unmanned aerial vehicle based on light field technology, comprising: a first camera configured to continuously obtain image information in a monitored area; a second camera, the second camera being a light field camera including a compound eye lens, and being configured to obtain, when it is determined that the obtained image information shows an unmanned aerial vehicle, light field information of the unmanned aerial vehicle; and a vertical rotating platform and a horizontal rotating platform arranged perpendicular to each other, the vertical rotating platform being configured to control the first camera and the second camera to rotate in a direction perpendicular to the horizontal rotating platform, and the horizontal rotating platform being configured to control the first camera and the second camera to rotate in a horizontal direction, wherein the first camera and the second camera can rotate synchronously under the control of the vertical rotating platform and the horizontal rotating platform; and a computer processor configured to analyze and judge whether the obtained image information in the monitored area shows the unmanned aerial vehicle, and calculate depth information of the unmanned aerial vehicle by means of the obtained light field information, so as to obtain the position of the unmanned aerial vehicle.

In one aspect of the present invention, the vertical rotating platform controls the first camera and the second camera to rotate within an elevation angle of 15-45 degrees. The horizontal rotating platform controls the first camera and the second camera to rotate within 0-120 degrees. The second camera further includes a telephoto lens group having approximate 1-degree diagonal lenses and a camera photosensitive element, and the compound eye lens is disposed between the telephoto lens group and the camera photosensitive element and close to the camera photosensitive element. The compound eye lens is a micro-lens array. The micro-lens array has a linear arrangement or hexagonal arrangement, and each row is staggered with respect to a previous row in the hexagonally arranged micro-lens array. Each micro-lens of the hexagonal micro-lens array has a width of 60 μm, but two micro-lenses exist within 90 μm.

A light field image I(x, y) may be represented by the formula:

$$I(x,y)=\iint L_F(u,v,x,y)dudv \quad (1)$$

wherein (u, v, x, y) represents light traveling along a light ray intersecting a main lens at (u, v) and a micro-lens plane at (x, y), and full aperture is used; FIG. 3(d) is a schematic diagram of a principle of calculating a refocused image by moving a sub-aperture image of a light field imaging system in the present invention, and the refocused image is calculated by moving the sub-aperture image in the manner shown in FIG. 3(d).

A shifted light field function may be represented as:

$$L_{F'}(u, v, e', y') = L_F\left(u, v, u + (x' - u)\frac{d}{d'}, v + (y' - v)\frac{d}{d'}\right) \quad (2)$$

The system of optical monitoring an unmanned aerial vehicle based on three-dimensional light field technology according to the present invention can isolate vibration in a monitoring process, thereby improving the efficiency and accuracy during the monitoring or detecting of the unmanned aerial vehicle.

BRIEF DESCRIPTION OF THE DRAWINGS

To describe the technical solutions in the embodiments of the present invention clearly, the following contents briefly describe the accompanying drawings required for the embodiments. Apparently, the accompanying drawings in the following description show merely some examples of the present invention, and a person of ordinary skill in the art may still derive other drawings from these accompanying drawings without innovative efforts.

DETAILED DESCRIPTION

Embodiments of the present invention will now be described with reference to the accompanying drawings. The present invention may, however, be implemented in many different forms and should not be construed as being limited to the embodiments set forth herein. These embodiments are provided only for thoroughness and completeness of the present invention, such that the scope of the present invention may be fully conveyed to those skilled in the art. The terms used in the detailed description of the embodiments illustrated in the accompanying drawings are not intended to limit the present invention.

Figure 1:
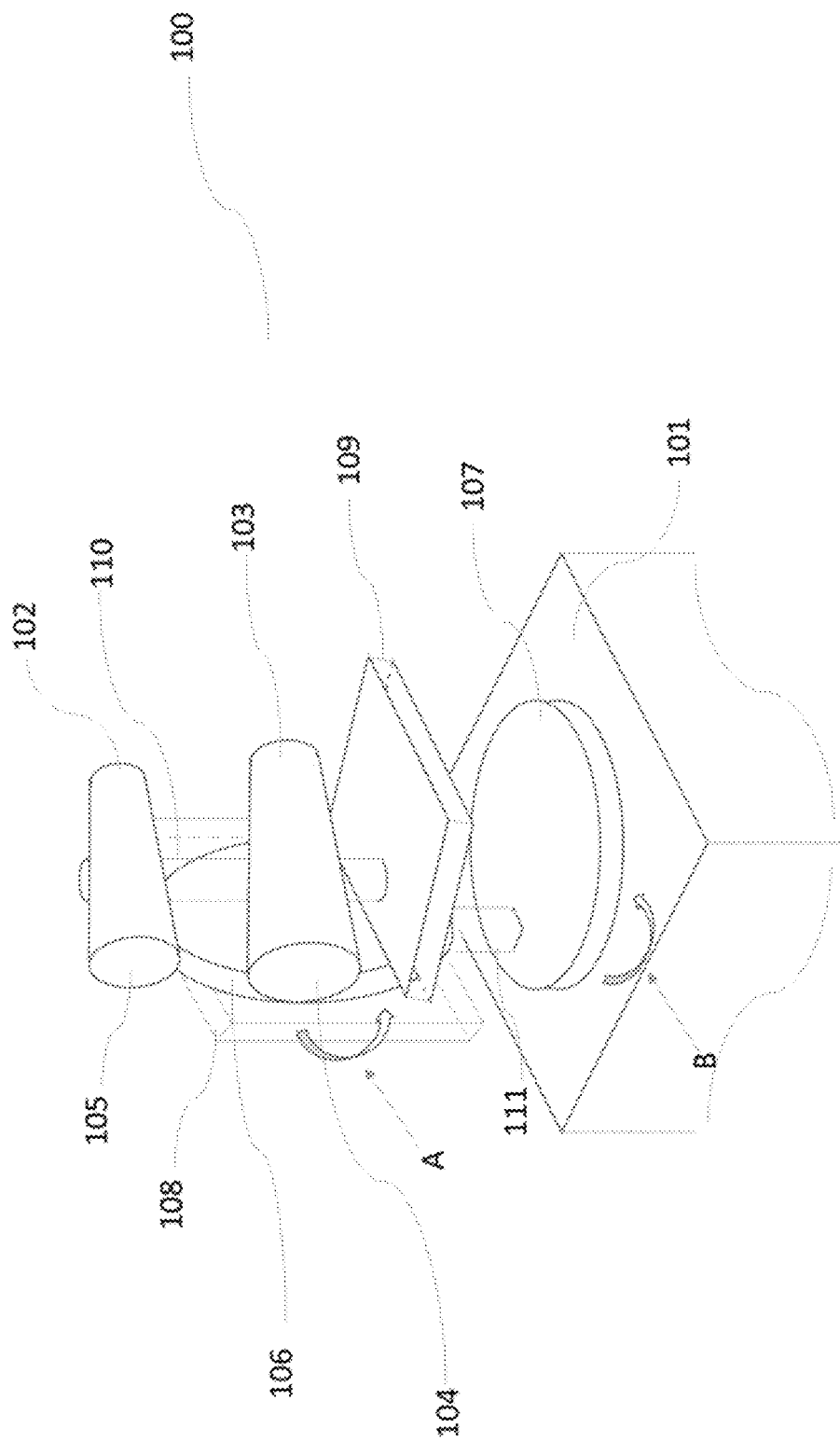
FIG. 1 is a schematic structural diagram of a system of monitoring an unmanned aerial vehicle according to the present invention.

FIG. 1 is a schematic structural diagram of a system of monitoring an unmanned aerial vehicle 100 according to the present invention. The system 100 includes: a case 101 configured to store a processor and a rotating platform controller; a first camera 102; a second camera 103; a telephoto lens 104; a wide-angle lens 105; a vertical rotating platform 106; a horizontal rotating platform 107; a vertical support panel 108; and a horizontal support plate 109. Both the first camera 102 and the second camera 103 are high-resolution cameras, have axes parallel to each other and are fixed on the horizontal support plate 109 by a fixing rod 110. The vertical rotating platform 106 is fixed to one side of the horizontal support plate 109; an axis part of the vertical rotating platform 106 is fixed to the vertical support panel 108, and the vertical rotating platform 106 has a horizontal axis, and can rotate around the axis in a direction of arrow A and a direction opposite to arrow A respectively. Since the vertical rotating platform 106, the horizontal support plate 109 and the first fixing rod 110 are fixed to each other, the first fixing rod 110 fixed to the horizontal support plate 109 may be driven to simultaneously move the first camera 102 and the second camera 103 when the vertical rotating platform 106 rotates around the axis thereof; that is, the first camera 102 and the second camera 103 synchronously rotate around the vertical rotating platform in the direction of arrow A or the direction opposite to arrow A. In one embodiment, the range of rotation may be an elevation angle of 15-45 degrees. Further, the vertical support panel 108 is fixed to a second fixing rod 111, and the second fixing rod 111 is fixed to the horizontal rotating platform 107. As shown in FIG. 1, with driving by the second fixing rod 111, the first camera 102, the second camera 103, the telephoto lens 104, the wide-angle lens 105, the vertical rotating platform 106, the vertical support panel 108, and the horizontal support plate 109 may rotate around the axis of the horizontal rotating platform 107 along a direction of arrow B or a direction opposite to arrow B. The axis of the horizontal rotating platform 107 is perpendicular to the rotation direction of the horizontal rotating platform. Likewise, since the second fixing rod 111 is fixed to the horizontal rotating platform 107, the light field camera 102 and the normal camera 103 can be simultaneously driven to move simultaneously, when the second fixing rod 111 rotates on the horizontal rotating platform 107 in the direction of arrow B or the direction opposite to arrow B; that is, the light field camera 102 and the normal camera 103 synchronously rotate around the horizontal rotating platform in the direction of arrow B or the direction opposite to arrow B. In one embodiment, the range of rotation range may be an elevation angle of 15-45 degrees. In one embodiment, the range of rotation may be a range allowed by the horizontal rotating platform, particularly preferably a range of 0-120 degrees.

The horizontal rotating platform 107 is a vibration-free optical platform and placed on the case 101. The case 101 is configured to accommodate a computer workstation including the processor and the rotating platform controller. The horizontal rotating platform 107 provides a horizontal plane, and a camera system fixed on the horizontal rotating platform 107 can track an unmanned aerial vehicle while kept being relatively fixed without being disturbed by vibration.

The two high-resolution cameras 102, 103 may have same camera body, for example, ultra high definition 4K (4096× 2160-pixel) camera; or different camera bodies. The second camera 103 is a wide-angle camera, and has a wide shooting range, an exaggerated distance sense, a wide focusing range, or the like. When a wide angle is used, an object in front of eyes can be enlarged, a distant object can be reduced, and surrounding images can be distorted. The wide angle also enables any point in an image to be adjusted to a most appropriate focal length, such that the picture is clearer, which can also be referred to as a full auto-focusing process, and the second wide-angle camera 103 can be a camera in which a single pixel on a camera photosensitive element has a size ranging from 1 micrometer to 8 micrometers. A view angle lens or a diagonal lens is included in the wide-angle second camera 103. The second camera 103 is an ultra-long-distance camera, and tracks the flying unmanned aerial vehicle using a super-telephoto lens, and the super-telephoto lens is a lens having a focal length ranging from 100 mm to 2200 mm. A structure of the second camera 103 will be described in detail below. The computer workstation is located inside the case 101 of the system of optical monitoring unmanned aerial vehicle 100, processes the acquired information, monitors flight of the unmanned aerial vehicle, and gives an alarm in time. The case 101 is mainly configured to protect the system of optical monitoring the unmanned aerial vehicle 100 in an outdoor environment, for example, an airport, or the like.

Figure 2:
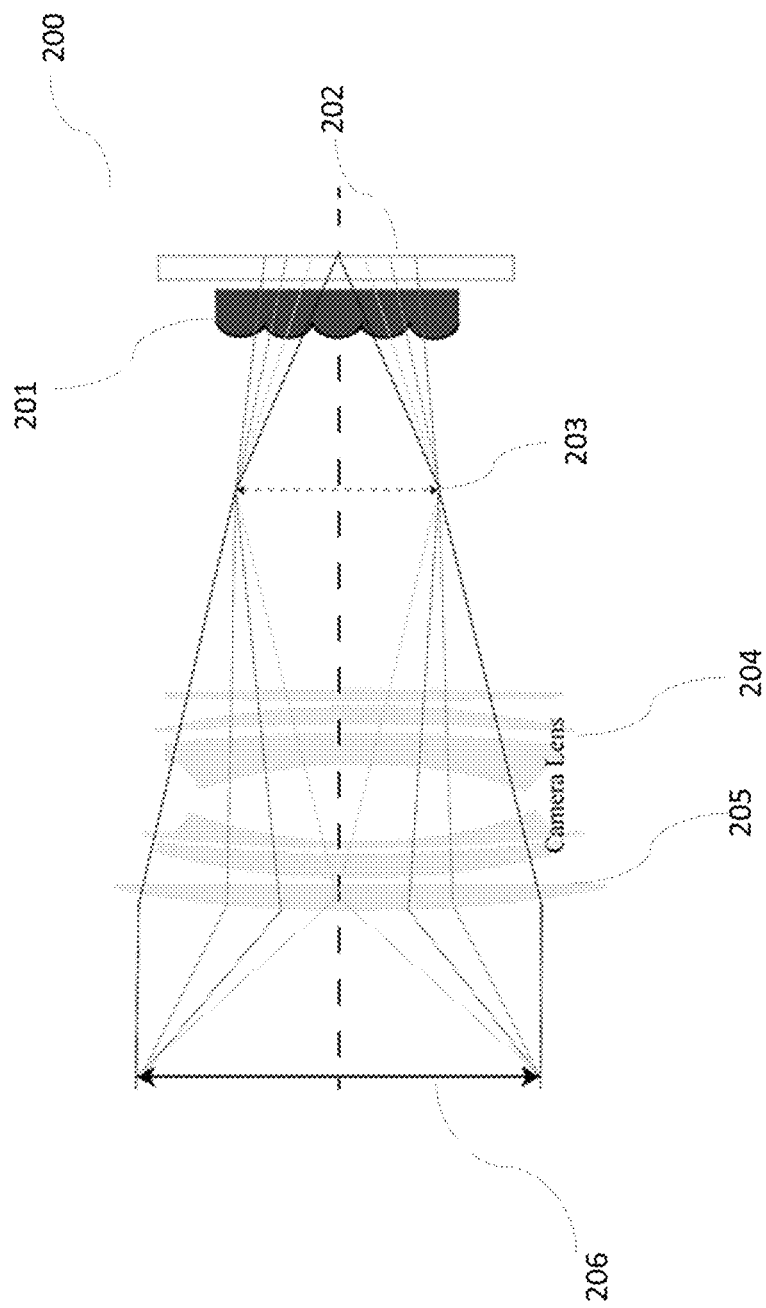
FIG. 2 is a schematic structural diagram of a second camera of the system of monitoring the unmanned aerial vehicle according to the present invention.

FIG. 2 is a schematic structural diagram of the second camera 103 of the system of monitoring an unmanned aerial vehicle according to the present invention. A micro-lens array 201 is disposed between the photosensitive element 202 and camera lenses 204 and 205 of the second camera 103 (i.e., light field camera). A photo taken by the second camera 103 is enlarged on a display, and it may be observed that the photo is composed of circular sub-images distributed at equal intervals in both horizontal and vertical directions. Each sub-image corresponds to one micro-lens. The second camera 103 can be a light field camera, and further includes a super-telephoto lens group 204, 205 having approximate 1-degree diagonal lenses. Lenses with focal lengths ranging from 100 mm to 2200 mm can be adopted in the super-telephoto lens group 204, 205. In one embodiment, the second camera 103 further includes a micro-lens array 201, such that the second camera 103 becomes a compound eye camera, for example, an ultra high definition (UHD) 4K compound eye camera, in which the micro-lens array 201 is designed according to an image sensor specification and a microscope optical path. The camera with a compound eye lens has a same shooting mode as the normal camera when taking photos, and after the shot picture is enlarged before processed, it can be observed that the whole image is formed by combining small images of all the compound eye lenses. The picture may be refocused to a different focal plane after processed by light field computing software, and the light field image can obtain the depth information of the shot image due to the refocusing characteristic. This is because the image with recorded light field information may be shot before the compound eye lens is mounted on the camera photosensitive element.

Figure 3A:
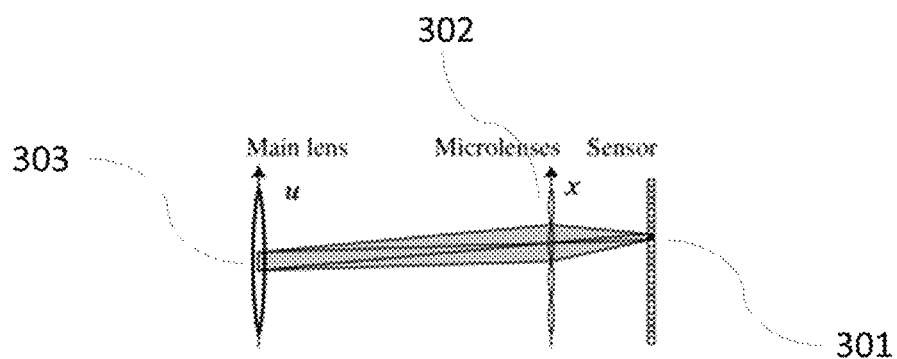
FIGS. 3(a) and 3(b) are diagrams of a principle of a light field imaging system in the present invention.
Figure 3B:
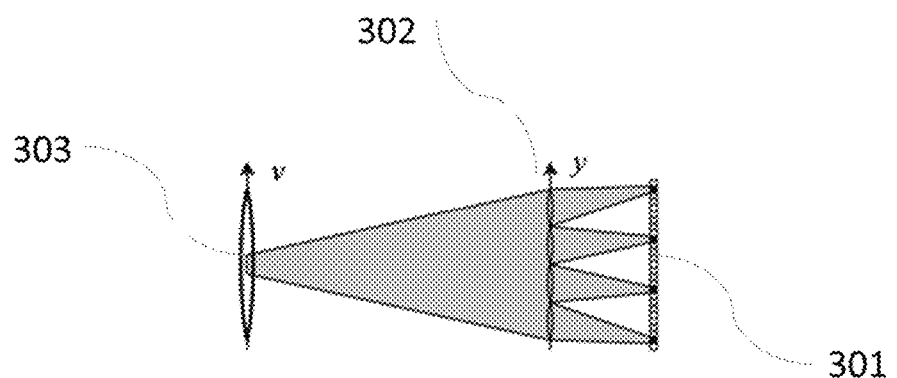

FIGS. 3(a) and 3(b) are diagrams of a principle of a light field imaging system in the present invention, and show a mechanism of a light field imaging system with a micro-lens array 302 in front of a CMOS sensor 301. In FIG. 3(a), all light rays passing through pixels pass through parent micro-lenses thereof and a conjugate square (sub-aperture) on a main lens 303. In FIG. 3(b), all light rays passing through the sub-aperture are focused by the corresponding pixels under different micro-lenses. These pixels form a photo seen through the sub-aperture.

Figure 3C:
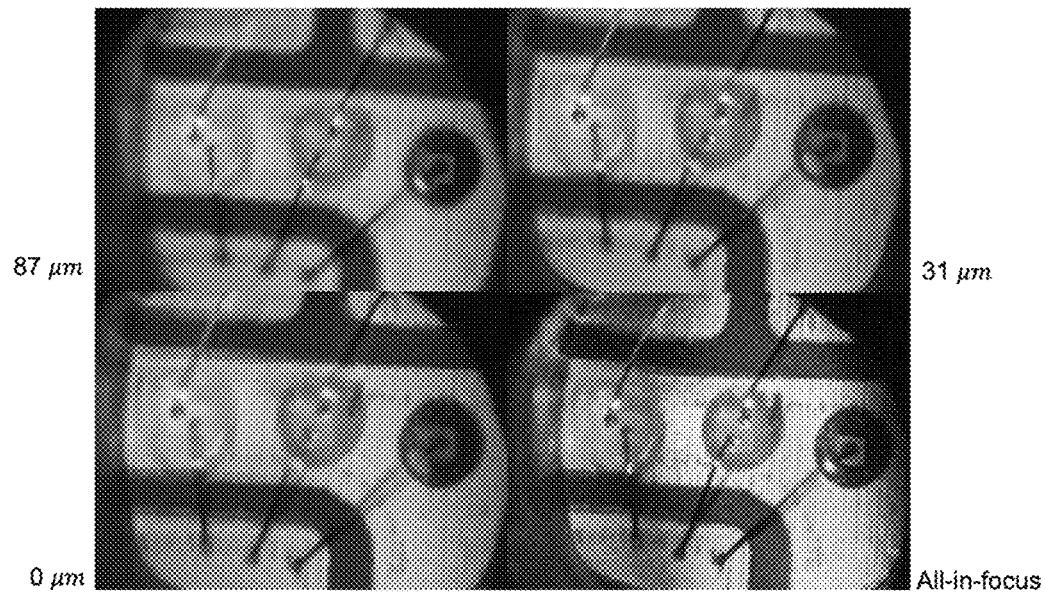
FIG. 3(c) is an exemplary view of a processed light field image.
Figure 3D:
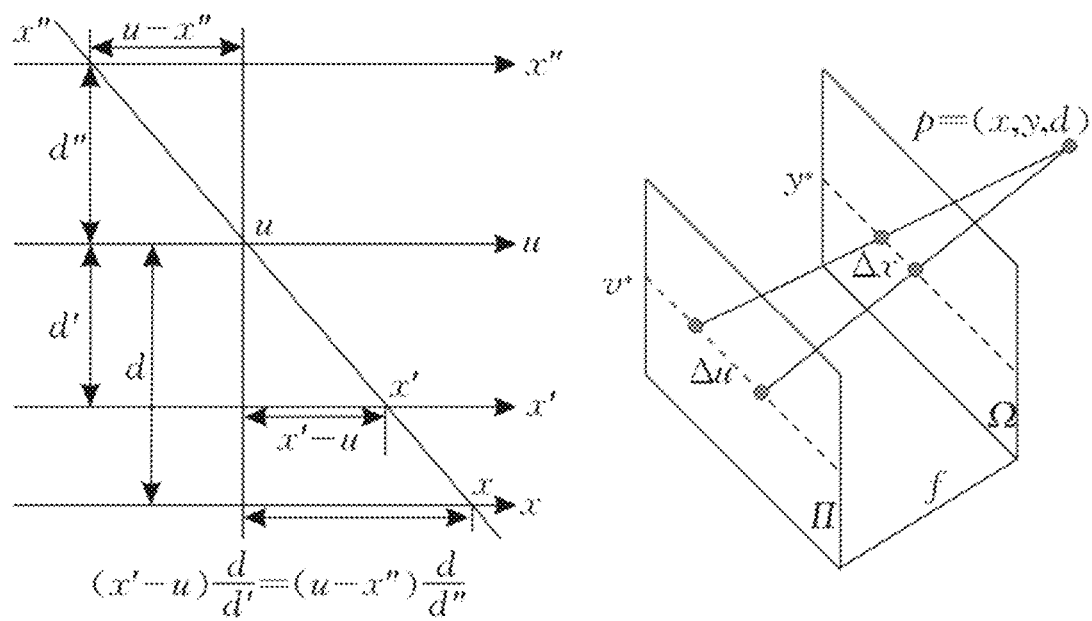
FIG. 3(d) is a schematic diagram of a principle of calculating a refocused image by moving a sub-aperture image of the light field imaging system in the present invention.

A light field image I(x, y) may be represented by the formula:

$$I(x,y) = \iint L_F(u,v,x,y) du dv \quad (1)$$

wherein (u, v, x, y) represents light traveling along a light ray intersecting the main lens at (u, v) and a micro-lens plane at (x, y), and full aperture is used; FIG. 3(d) is a schematic diagram of a principle of calculating a refocused image by moving a sub-aperture image of the light field imaging system in the present invention, and the refocused image is calculated by moving the sub-aperture image in the manner shown in FIG. 3(d).

A shifted light field function may be represented as:

$$L_{F'}(u, v, e', y') = L_F\left(u, v, u + (x' - u)\frac{d}{d'}, v + (y' - v)\frac{d}{d'}\right) \quad (2)$$

Light field imaging technology allows refocusing the image and estimating a depth map of a scenario. A basic depth range is computed by means of a light field, and the position of the unmanned aerial vehicle is determined by combining the depth range with a position on the image.

For fabrication of semiconductors applied on a chip board, a compound eye may be used to find a maximum loop height of an aluminum bonding wire, a first bonding height on a chip and a second bonding height on a substrate. FIG. 3(c) is exemplary views of processed light field images. In FIG. 3(c), a greater number (μm) in the positive direction means a closer virtual focal plane towards an objective lens. The focal plane on a surface of the objective lens is calibrated to 0 μm. In the processed light field images, the upper left image of FIG. 3(c) shows a top wire layer, the upper right image of FIG. 3(c) shows a middle layer, the lower left image of FIG. 3(c) shows a bottom metal layer, and the lower right image of FIG. 3(c) shows an all-in-focus image. Auto-focusing software will be developed to capture all wire images without commanding any mechanical movement of a vertical axis. Real-time AOI software will be developed and used in conjunction with the auto-focusing software. A user interface will display the image shot by the camera and the all-in-focus image, and any detected defect will be marked.

Compared with an existing mode of obtaining a distance using a distance marker, the mode of obtaining the distance using the depth information is simpler and more convenient, and can obtain clear images and accurate distance information.

Therefore, the micro-lens array 201 is only mounted to the second camera 103 and not mounted to the first camera 102. In a process of designing parameters of the micro-lens array 201, a pixel pitch and a sensor size serve as influencing factors. The micro-lens array has a linear alignment strategy and a hexagonal alignment strategy. The hexagonal micro-lens array is slightly different from the linear array in that each micro-lens has a width of 60 μm, but two micro-lenses exist within 90 μm. The second camera 103 further includes the camera photosensitive element 202 close to the micro-lens array 201. An example of the photosensitive element 202 is a CMOS charge-coupled device (CCD) image sensor configured to convert a sensed light signal into an electrical signal. When the second camera 103 finds a photographed object 206, a virtual image 203 of the photographed object is formed by the super-telephoto lens group 204, 205, and forms a high-definition electrical image signal in the photosensitive element 202 after processed by the micro-lens array 201.

Figure 4A:
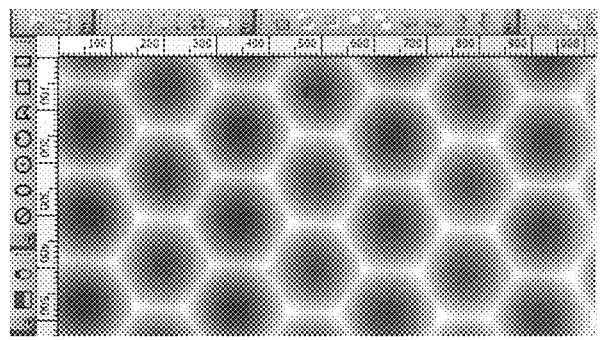
FIG. 4(a) is a micrograph of a hexagonal micro-lens array of the second camera 103 of the system of monitoring an unmanned aerial vehicle according to the present invention.
Figure 4B:
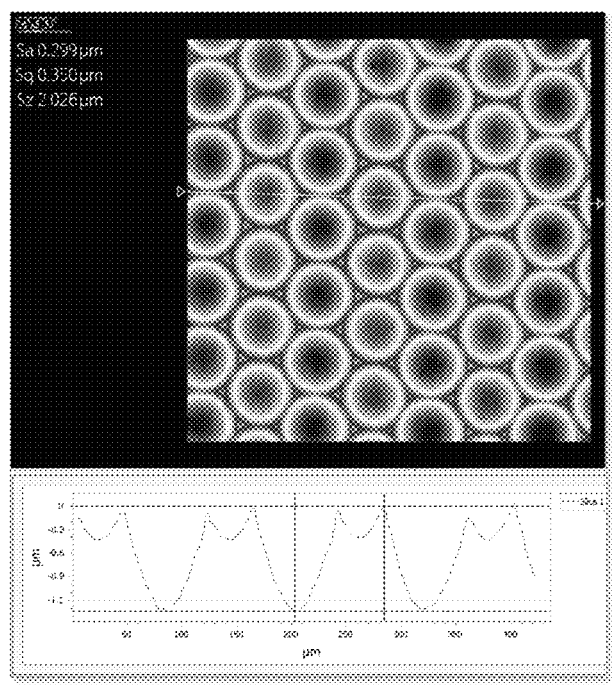
FIG. 4(b) is a white light interferometer detection view of the hexagonal micro-lens array of the second camera 103 of the system of monitoring the unmanned aerial vehicle according to the present invention.

FIG. 4(a) is a micrograph of the hexagonal micro-lens array of the second camera 103 of the system of monitoring the unmanned aerial vehicle according to the present invention. Coordinates are in microns. FIG. 4(b) is a white light interferometer detection view of the hexagonal micro-lens array of the second camera 103 of the system of monitoring the unmanned aerial vehicle according to the present invention. The same micro-lens array is detected in FIGS. 4(a) and 4(b). In one example, the micro-lens array is arranged as a linear array. However, the arrangement of the linear array may cause a large gap between the micro-lenses, and the gap can not generate an image. Therefore, in another example, the micro-lens array may have a hexagonal arrangement, and the hexagonal micro-lens array may greatly reduce the gap between the micro-lenses due to a staggered arrangement of each row with respect to a previous row, thereby improving utilization efficiency of the image sensor behind the micro-lenses. During calculation of the light field information, it is necessary to ensure that each sub-image is extracted by a program by means of linear alignment, and therefore, a transverse reference line and a longitudinal reference line are generated and pass through centers of the transverse sub-image and the longitudinal sub-image, and then, all the sub-images can be captured and the depth information can be calculated. For the hexagonal micro-lens array shown in FIG. 4(a), due to the staggered distribution of the micro-lenses, a new alignment method is required for alignment to enable software to accurately extract, compare and analyze the image of each micro-lens. As shown in FIG. 4(a), the hexagonal micro-lens array pattern is much denser than the linear micro-lens array pattern. The hexagonal micro-lens array has linear alignment in the vertical direction and translation in the horizontal direction. Therefore, the hexagonal micro-lens array pattern may be adopted in the system of monitoring the unmanned aerial vehicle according to the present invention. This is because the denser hexagonal micro-lens array pattern may provide a higher-resolution light field imaging system.

Figure 5:
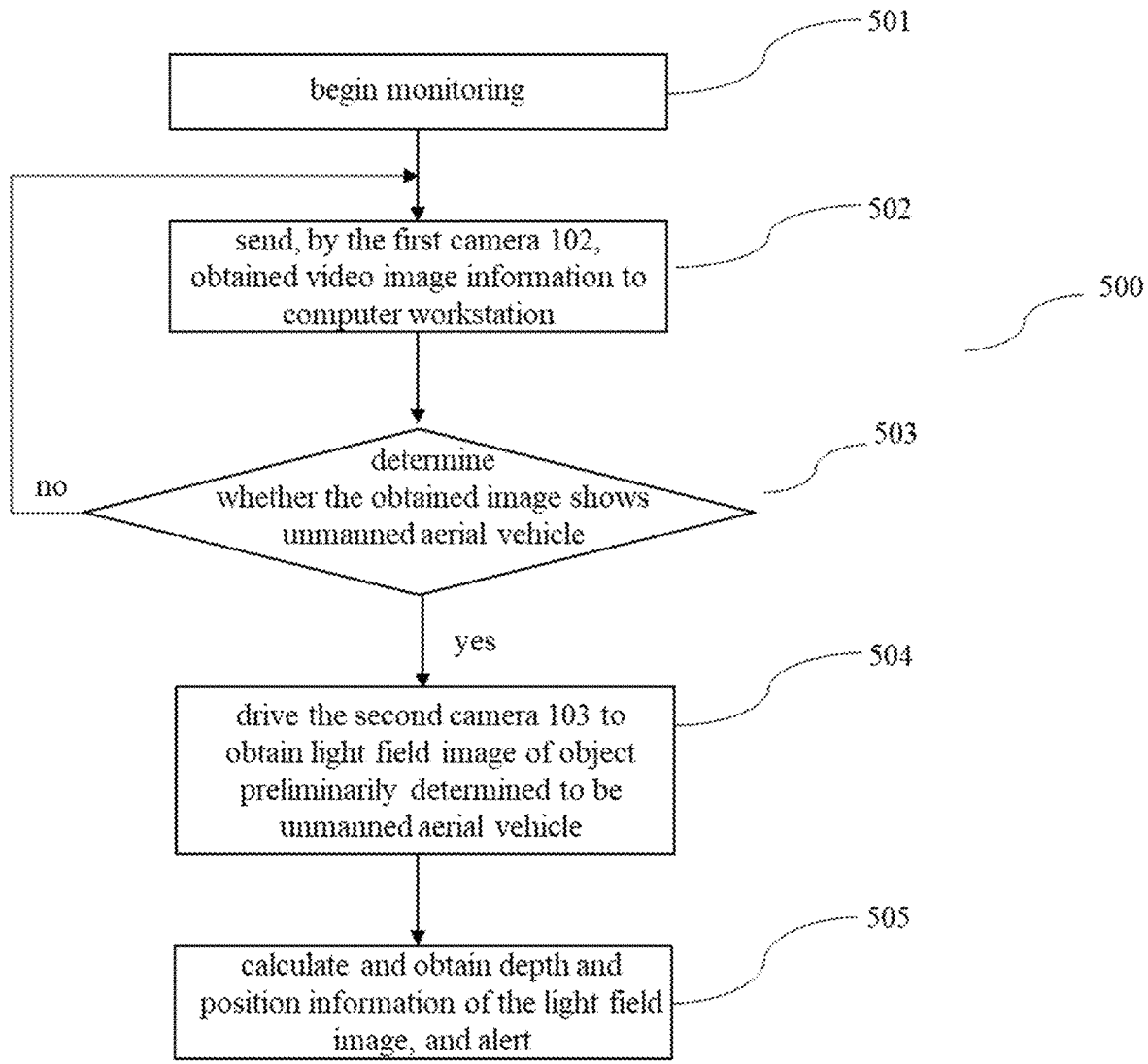
FIG. 5 is diagram of a working principle of the system of monitoring the unmanned aerial vehicle according to the present invention.

FIG. 5 is a flow chart 500 of operation of the system of monitoring the unmanned aerial vehicle according to the present invention. At step 501, the system of monitoring the unmanned aerial vehicle is started to begin monitoring. At step 502, the second camera 103 is continuously operated and constantly sends the acquired video image information over a wide range to the computer workstation. Since the second camera 103 is a wide-angle camera, the camera can scan a protection area and capture a high definition 4K video. Meanwhile, as a scanning range is large, the obtained image has a low resolution, and a clear unmanned aerial vehicle image is unable to be obtained. The videos captured by the wide-angle second camera 103 will be always processed by a computer. When the unmanned aerial vehicle enters into a field of view of the camera, the computer monitors the unmanned aerial vehicle using a machine learning-based monitoring algorithm. If no unmanned aerial vehicle is monitored, no control signal is generated. After the unmanned aerial vehicle is monitored and confirmed, a position coordinate of the unmanned aerial vehicle is compared with a center coordinate of the field of view of the camera by the computer, and a control signal is generated if the comparison value exceeds a threshold in the horizontal or vertical direction, and connected to the platform controller through a USB interface. At step 503, by comparison with a database stored in the computer workstation, it is determined whether the obtained image conforms to a shape of the unmanned aerial vehicle in the database, once a target is matched, proceeding to step 504. When the monitored unmanned aerial vehicle is located at the center of the field of view of the camera, a signal is generated to control the horizontal rotating platform 107 and the vertical rotating platform 106 to rotate to proper positions, a picture is taken by the second camera 103, the taken picture including a light field image of the shot scene, and then the picture is sent to light field processing software for information processing; that is, driving the second camera 103 of the system of monitoring the unmanned aerial vehicle 100, and tracking a suspicious target by the telephoto lens focused on the locked target, thereby obtaining a high-resolution image and light field information of the target unmanned aerial vehicle, and proceeding to step 504; in a mismatched case, returning to the step 502, and repeatedly sending video image information obtained by the second camera 103 to the computer workstation. At step 504, after calculation and verification are performed on the information by the system of monitoring the unmanned aerial vehicle 100 again, depth and position information of the light field image is calculated and obtained and an alert is sent to a user or a control tower. That is, once the high-resolution image has a high similarity to the shape information of the unmanned aerial vehicle in the database, an alarm signal is sent to the monitoring system, and the depth and position information of the unmanned aerial vehicle is also sent back to a surveillance center.

The "an embodiment", "one embodiment" or "one or more embodiments" mentioned herein means that the specific features, structures or characteristics described in combination with the embodiment(s) would be included in at least one embodiment of the present invention. Moreover, it should be noted that, the wording "in an embodiment" herein may not necessarily refer to the same embodiment.

The above description is only for the purpose of illustrating the technical solutions of the present invention, and any person skilled in the art may make modifications and changes to the above embodiments without departing from the spirit and scope of the present invention. Therefore, the protection scope of the present invention should be subject to the claims. The present invention has been described above with reference to examples. However, other embodiments than the above embodiments are equally possible within the scope of this disclosure. The different features and steps of the present invention may be combined in other ways than those described. The scope of the present invention is limited only by the appended claims. More generally, those skilled in the art will readily appreciate that all parameters, dimensions, materials, and configurations described herein are meant to be exemplary and that actual parameters, dimensions, materials, and/or configurations will depend upon specific applications or applications for which the teachings of the present invention are used.

What is claimed is:

1. A system of monitoring an unmanned aerial vehicle based on light field technology, comprising:
    a first camera configured to continuously obtain image information in a monitored area;
    a second camera, which is a light field camera comprising a compound eye lens, and is configured to obtain, when it is determined that the obtained image information shows an unmanned aerial vehicle, light field information of the unmanned aerial vehicle; and
    a vertical rotating platform and a horizontal rotating platform arranged perpendicular to each other,
    the vertical rotating platform being configured to control the first camera and the second camera to rotate in a direction perpendicular to the horizontal rotating platform, and
    the horizontal rotating platform being configured to control the first camera and the second camera to rotate in a horizontal direction,
    wherein the first camera and the second camera can rotate synchronously under the control of the vertical rotating platform and the horizontal rotating platform; and
    a computer processor configured to analyze and judge whether the obtained image information in the monitored area shows the unmanned aerial vehicle, and calculate depth information of the unmanned aerial vehicle by means of the obtained light field information, so as to obtain the position of the unmanned aerial vehicle.

2. The system of monitoring an unmanned aerial vehicle of claim 1, wherein the vertical rotating platform controls the first camera and the second camera to rotate within an elevation angle of 15-45 degrees.

3. The system of monitoring an unmanned aerial vehicle of claim 2, wherein the second camera further comprises a telephoto lens group having approximate 1-degree diagonal lenses and a camera photosensitive element, and the compound eye lens is disposed between the telephoto lens group and the camera photosensitive element and close to the camera photosensitive element.

4. The system of monitoring an unmanned aerial vehicle of claim 1, wherein the horizontal rotating platform controls the first camera and the second camera to rotate within 0-120 degrees.

5. The system of monitoring an unmanned aerial vehicle of claim 4, wherein the second camera further comprises a telephoto lens group having approximate 1-degree diagonal lenses and a camera photosensitive element, and the compound eye lens is disposed between the telephoto lens group and the camera photosensitive element and close to the camera photosensitive element.

6. The system of monitoring an unmanned aerial vehicle of claim 1, wherein the second camera further comprises a telephoto lens group having approximate 1-degree diagonal lenses and a camera photosensitive element, and the compound eye lens is disposed between the telephoto lens group and the camera photosensitive element and close to the camera photosensitive element.

7. The system of monitoring an unmanned aerial vehicle of claim 6, wherein the compound eye lens is a micro-lens array.

8. The system of monitoring an unmanned aerial vehicle of claim 7, wherein the micro-lens array has a linear arrangement or hexagonal arrangement, and each row is staggered with respect to a previous row in the hexagonally arranged micro-lens array.

9. The system of monitoring an unmanned aerial vehicle of claim 8, wherein each micro-lens of the hexagonal micro-lens array has a width of 60 μm, but two micro-lenses exist within 90 μm.

10. The system of monitoring an unmanned aerial vehicle of claim 1, wherein the light field information I(x,y) may be represented by the formula:

$$I(x,y) = \iint L_F(u,v,x,y) du dv \qquad (1)$$

wherein (u,v,x,y) represents light traveling along a light ray intersecting a main lens at (u,v) and a micro-lens plane at (x,y) and full aperture is used; and a refocused image is calculated by moving a sub-aperture image, and a shifted light field function can be represented as:

$$L_{F'}(u, v, e', y') = L_F\left(u, v, u + (x' - u)\frac{d}{d'}, v + (y' - v)\frac{d}{d'}\right). \qquad (2)$$

* * * * *